United States Patent
Mizikovsky et al.

(10) Patent No.: US 7,752,441 B2
(45) Date of Patent: Jul. 6, 2010

(54) METHOD OF CRYPTOGRAPHIC SYNCHRONIZATION

(75) Inventors: Simon B. Mizikovsky, Morganville, NJ (US); Robert J. Rance, Andover, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1141 days.

(21) Appl. No.: 11/352,950

(22) Filed: Feb. 13, 2006

(65) Prior Publication Data

US 2007/0192605 A1 Aug. 16, 2007

(51) Int. Cl.
*H04L 9/32* (2006.01)

(52) U.S. Cl. ......... 713/168; 713/151; 713/162; 713/182; 455/431; 455/432; 455/433; 455/434; 455/435; 370/349; 370/522

(58) Field of Classification Search ......... 713/151, 713/162, 166, 168, 170, 171, 172, 182; 340/5.26, 340/5.72; 380/46; 705/65; 455/13.2; 702/62; 370/349, 522
See application file for complete search history.

(56) References Cited

U.S. PATENT DOCUMENTS 6,367,014 B1 * 4/2002 Proust et al. ......... 713/182
7,461,248 B2 * 12/2008 Zhang et al. ......... 713/155

FOREIGN PATENT DOCUMENTS

| EP | 0998095 A2 | 5/2000 |
| WO | WO03/69206 | 11/2000 |
| WO | WO2005/032201 | 4/2005 |
| WO | WO 2005034542 | * 4/2005 |

OTHER PUBLICATIONS

PCT/US2007/003054 International Search Report and Written Opinion (Oct. 18, 2007).
WiMAX End-to-End Network Systems Architecture, *Stage 2: Architecture Tenets, Reference Model and Reference Points*) *WiMAX Forum Proprietary*, Dec. 2005.
Part 16: Air Interface for Fixed and Mobile Broadband Wireless Access Systems Amendment for Physical and Medium Access Control Layers for Combined Fixed and Mobile Operation in Licensed Bands; *IEEE WirelessMAN P802.16e/D12*, Oct. 2005.

* cited by examiner

*Primary Examiner*—Taghi T Arani
*Assistant Examiner*—Josnel Jeudy
(74) *Attorney, Agent, or Firm*—Williams, Morgan & Amerson PC

(57) ABSTRACT

The present invention provides a method of cryptographic synchronization. The method may include providing information indicative of a first counter to a first one of a plurality of base stations. The first counter is incremented prior to each message transmitted to each of the plurality of base stations. The method may also include authenticating at least one first message received from the first one of the plurality of base stations in response to providing the information indicative of first counter.

17 Claims, 3 Drawing Sheets

METHOD OF CRYPTOGRAPHIC SYNCHRONIZATION

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of geographic areas that are often referred to as cells. Mobile units located in each cell may access the wireless communications system by establishing a wireless communication link, often referred to as an air interface, with a base station associated with the cell. The mobile units may include devices such as mobile telephones, personal data assistants, smart phones, Global Positioning System devices, wireless network interface cards, desktop or laptop computers, and the like. Communication between the mobile unit and the base station may be authenticated and/or secured using one or more authentication protocols.

Mobile units having an established security association with a first base station may roam to another cell served by a second base station. The second base station and a roaming mobile unit may therefore mutually authenticate and/or validate each other to verify the legitimacy of the second base station and the mobile unit before beginning secure transmissions. For example, in a WiMAX wireless communication system such as defined by the IEEE 802.16e standards, the mobile unit may validate a message authentication code (e.g., a cipher-based message authentication code, CMAC, and/or a hashed message authentication code, HMAC) that is generated by the second base station and attached to a downlink message provided to the mobile unit. The base station also validates a message authentication code provided by the mobile unit in an uplink message. The message authentication codes are generated using secret keys derived from the secret key AK.

Authentication schemes that use message authentication codes to validate roaming mobile units to base stations may be vulnerable to replay (or repeat) attacks. In a replay attack, an illegitimate mobile unit or base station intercepts a valid message authentication code in an uplink or downlink message from a legitimate mobile unit or base station. The illegitimate mobile unit or base station then transmits a copy of the valid message authentication code to a base station or mobile unit, which may then initiate secure communication with the illegitimate mobile unit or base station based on the replayed copy of the valid message authentication code.

Replay attacks may be prevented by including a counter (or crypto-sync) in the computation of the message authentication code. For example, the IEEE 802.16e standards define two CMAC Packet Number Counters, which are four byte sequential counters that may be incremented in the context of an uplink message by the mobile unit and in the context of a downlink message by the base station. The downlink counter CMAC_PN_D is maintained by the base station and incremented for every downlink message transmitted to the mobile unit. The uplink counter CMAC_PN_U is maintained by the mobile unit and incremented for every uplink message transmitted to the base station. The receiving side may then verify that the value of the received counter has not been repeated. For example, the receiving side may insure that the received counter is larger than the previous value of the counter received from the transmitting side.

Conventional authentication schemes, such as the WiMAX wireless communication system defined by the IEEE 802.16e standards, associate the uplink and a downlink counters with the secret key AK. Since the secret key AK is unique to each security association between a base station and a mobile unit, the base stations and mobile units in the wireless communication system must maintain a record of the secret key, the current value of the uplink counter, the current value of the downlink counter, and other AK-related parameters. This combination is typically referred to as the AK context. To prevent replay attacks, each base station must maintain a record of the AK context for each mobile unit that ever had a security association with this base station and each mobile unit must maintain a record of the AK context for every base station that it ever had a security association with.

Caching of the AK context at every mobile unit and base station is inefficient and consumes a large amount of storage. Caching of the AK context at every mobile unit and base station may also create a security vulnerability. For example, if the size of the caching storage element is exceeded, the oldest AK context may be purged to allow room for a new AK context. Once the old AK context is lost, the receiving site cannot validate the freshness of the received counters and repeat or replay attacks may become possible.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method of cryptographic synchronization is provided. The method may include providing information indicative of a first counter to a first one of a plurality of base stations. The first counter is incremented prior to each message transmitted to each of the plurality of base stations. The method may also include authenticating at least one first message received from the first one of the plurality of base stations in response to providing the information indicative of first counter.

In another embodiment of the present invention a method of cryptographic synchronization is provided. The method may include receiving information indicative of a first counter from a mobile unit. The first counter is incremented prior to each message transmitted by the mobile unit. The method may also include authenticating the mobile unit based on the information indicative of the first counter and a value of a first register and providing a first message to the mobile unit in response to authenticating the mobile unit.

BRIEF DESCRIPTION OF THE DRAWINGS

The invention may be understood by reference to the following description taken in conjunction with the accompanying drawings, in which like reference numerals identify like elements, and in which.

Figure 1:
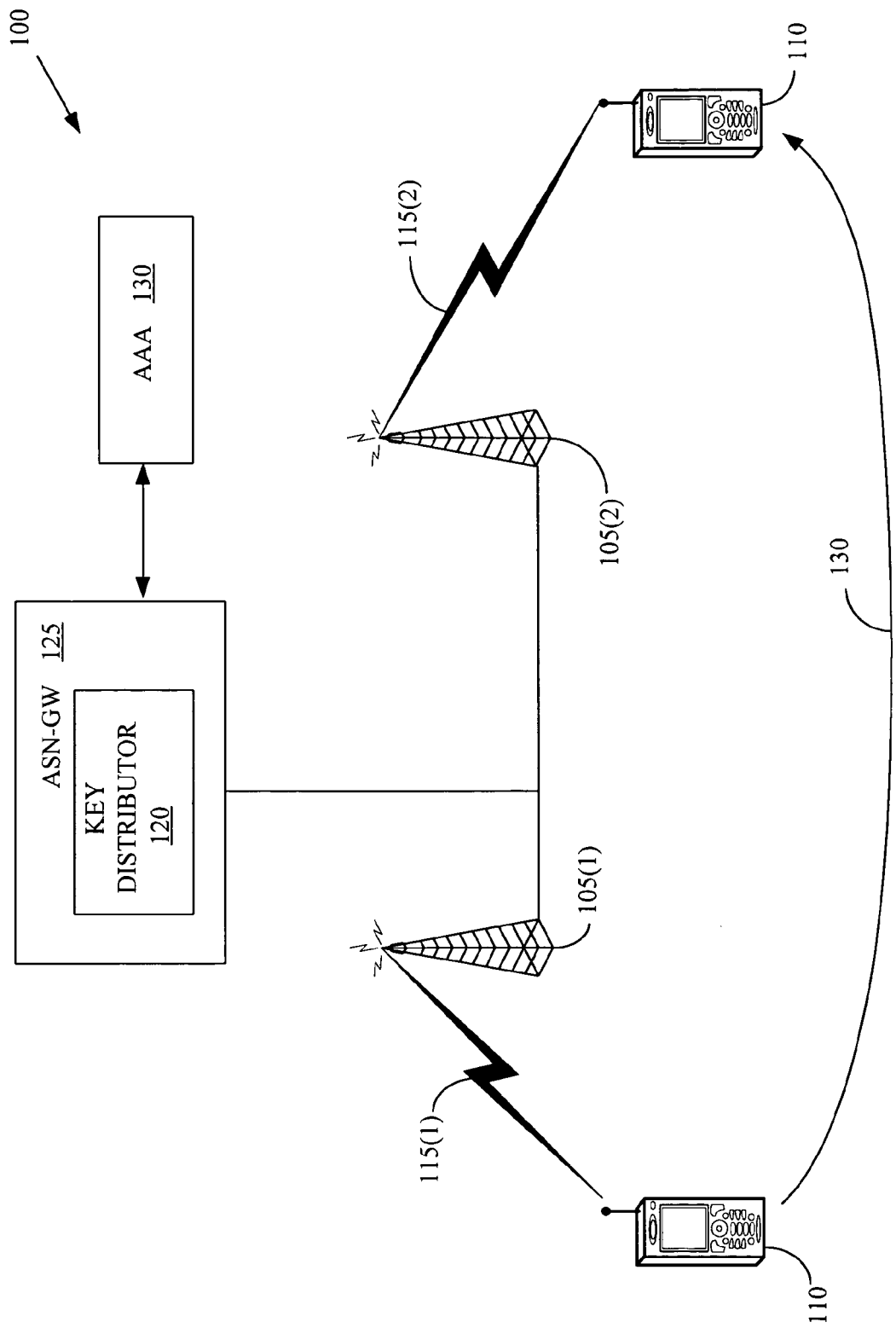
FIG. 1 conceptually illustrates one exemplary embodiment of a wireless communications system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communications system 100. In the illustrated embodiment, the wireless communications system 100 may provide wireless connectivity according to third generation wireless communication protocols such as described in the IEEE 802.16 broadband wireless system supported by network procedures specified by the WiMAX Forum. However, persons of ordinary skill in the art should appreciate that the present invention is not limited to a wireless communications system 100 that operates according to the IEEE 802.16 system. In alternative embodiment, any wireless communication protocol may be used to provide wireless connectivity. Furthermore, in some embodiments, the wireless communications system 100 may include, or be connected to, one or more wired communication systems.

The wireless communications system 100 shown in FIG. 1 may include one or more base stations 105(1-2). In the interest of clarity, the indices (1-2) will hereinafter be dropped when the base stations 105 are being referred to collectively. However, the indices (1-2) may be used when referring to the base stations 105 individually or to a subset of the base stations 105. The same convention will be used with regard to other indices that distinguish between components that share an identifying numeral. Although two base stations 105 are shown in FIG. 1, persons of ordinary skill in the art should appreciate that the present invention is not limited to wireless communication systems 100 including only two base stations 105. In alternative embodiments, any number of base stations 105 may be deployed in the wireless communication system 100. In the illustrated embodiment, the base stations 105 may provide wireless connectivity using orthogonal frequency division multiplexing (OFDM/OFDMA) techniques. However, persons of ordinary skill in the art should appreciate that the present invention is not limited to the use of orthogonal frequency division multiplexing techniques.

The base stations 105 may provide wireless connectivity to a mobile unit 110. In the interest of clarity, a single mobile unit 110 is depicted in FIG. 1. However, persons of ordinary skill in the art having benefit of the present disclosure should appreciate that the present invention is not limited to a single mobile unit 110 and in alternative embodiments any number of mobile units 110 may be deployed in the wireless communication system 100. The mobile unit 110 may be any type of mobile unit including, but not limited to, a cellular telephone, a personal data assistant, and a laptop computer. However, persons of ordinary skill in the art having benefit of the present disclosure should appreciate that the present invention is not limited to these particular examples of mobile units 110 and in alternative embodiments other types of mobile units 110 may also be used. Persons of ordinary skill in the art should also appreciate that the mobile units 110 may be referred to using other terms such as mobile shell, user equipment, user terminal, access terminal, subscriber station, subscriber terminal, and the like.

In the illustrated embodiment, the mobile unit 110 has an established security association with the base station 105(1) that permits secure transmissions over an air interface 115(1).

For example, the security association may be formed according to an extensible authentication protocol (EAP), which is an authentication protocol that provides an infrastructure to enables clients to authenticate with a central authentication server. During the initial authentication, an EAP authentication may be executed between the mobile unit 110, a key distributor 120 implemented in an Access Serving Network Gateway (ASN-GW) 125, and Authentication, Authorization, and Accounting server (AAA) 130 that handles various functions associated with authenticating and authorizing wireless communications, as well as providing billing services associated with a wireless communications. Techniques for performing the initial EAP authentication are known in the art and in the interest of clarity will not be discussed herein.

If the initial EAP authentication is successful, a Master Session Key (MSK) is derived by the AAA 130 and the mobile unit 110. The MSK is sent to the key distributor 120 by the AAA 130. The mobile unit 110 and the key distributor 120 may then derive a Pairwise Master Key (PMK) using the MSK. The PMK signifies the security association between the mobile unit 110 and the Access Serving Network Gateway 125 and/or the key distributor 120. Then, the key distributor 120 and the mobile unit 110 may derive an Authorization Key (AK) for each base station 105 from the PMK. The AK may then be sent to the corresponding base station 105 by the key distributor 120.

Messages transmitted over the air interface 115(1) may include, or be formed using, a message authentication code, such as a CMAC and/or an HMAC. The AK generated by the key distributor 120 and the mobile unit 110 may be the source of secrecy for generating the CMAC and/or the HMAC. The messages may be authenticated and the integrity of messages may be checked by validating the CMAC/HMAC. In one embodiment, the mobile unit 110 maintains a counter (or crypto-sync) that may be incremented immediately prior to transmitting each message over the air interface 115(1). For example, the IEEE 802.16e standards define an uplink CMAC Packet Number Counter, CMAC_PN_U, which is a four byte sequential counter that may be incremented in the context of an uplink message by the mobile unit 110. The mobile unit 110 uses the counter in the computation of the message authentication code. The base station 105(1) may include a register that stores the last received and authenticated value of the counter. Thus, when the base station 105(1) receives a message from the mobile unit 110, the base station 105(1) may verify that the value of the received counter has not been repeated, e.g., the base station 105(1) may verify that the value of the received counter is larger than the value stored in the register.

The base station 105(1) may also maintain a counter (or crypto-sync) that may be incremented immediately prior to transmitting each message over the air interface 115(1) and may be used in the computation of the message authentication code. For example, the IEEE 802.16e standards define a downlink CMAC Packet Number Counter, CMAC_PN_D, which is a four byte sequential counter that may be incremented in the context of a downlink message by the base station 105(1). The mobile unit 110 may include a register that stores the last received and authenticated value of the counter. Thus, when the mobile unit 110 receives a message from the base station 105(1), the mobile unit 110 may verify that the value of the received counter has not been repeated, e.g., the mobile unit 110 may verify that the value of the received counter is larger than the value stored in the register.

The mobile unit 110 may roam from its current geographic area, or cell, into another cell that is served by the base station 105(2), as indicated by the arrow 130. When the mobile unit 110 is handed off to the target base station 105(2), the key distributor 120 may provide new authorization key(s) for authenticating communications over the air interface 115(2). However, in the illustrated embodiment, the mobile unit 110 continues to increment the same uplink counter prior to each message transmitted over the new interface 115(2) to the new (target) base station 105(2). The base station 105(2) may also continue to increment the same downlink counter prior to each message transmitted over the new interface 115(2) to the mobile unit 110. Thus, the values of the uplink and/or downlink counters may be disassociated from the value of the authorization key.

In one embodiment, the mobile unit 110 may maintain a tuple that includes information indicative of the current value of the uplink counter and the value of a register that stores information indicating a last received and authenticated value of the downlink counter. The base stations 105 may then receive the value of the tuple from one of the other base stations 105, e.g., using backhaul communications. Alternatively, the base stations 105 may validate a tuple transmitted to the base stations 105 by the mobile unit 110. The mobile unit's 110 and the base station's 105 communications may then be mutually authenticated using the value of the tuple, as will be discussed in detail below.

Since the values of the uplink and/or downlink counters are incremented continually regardless of the value of the authorization key, the base stations 105 do not need to maintain (or cache) a record of the AK context for each mobile unit 110 that ever had a security association with the base station 105. The mobile unit 110 also does not need to maintain (or cache) a record of the AK context for every base station 105 that it ever had a security association with. Instead, the base stations 105 and/or the mobile units 110 may simply store and/or retrieve a single tuple including information indicative of the uplink and downlink counters. The memory requirements for storing the uplink and/or downlink counters, as well as the uplink and/or downlink registers, are minimal and therefore the values of the tuples are unlikely to be lost due to purging.

Figure 2:
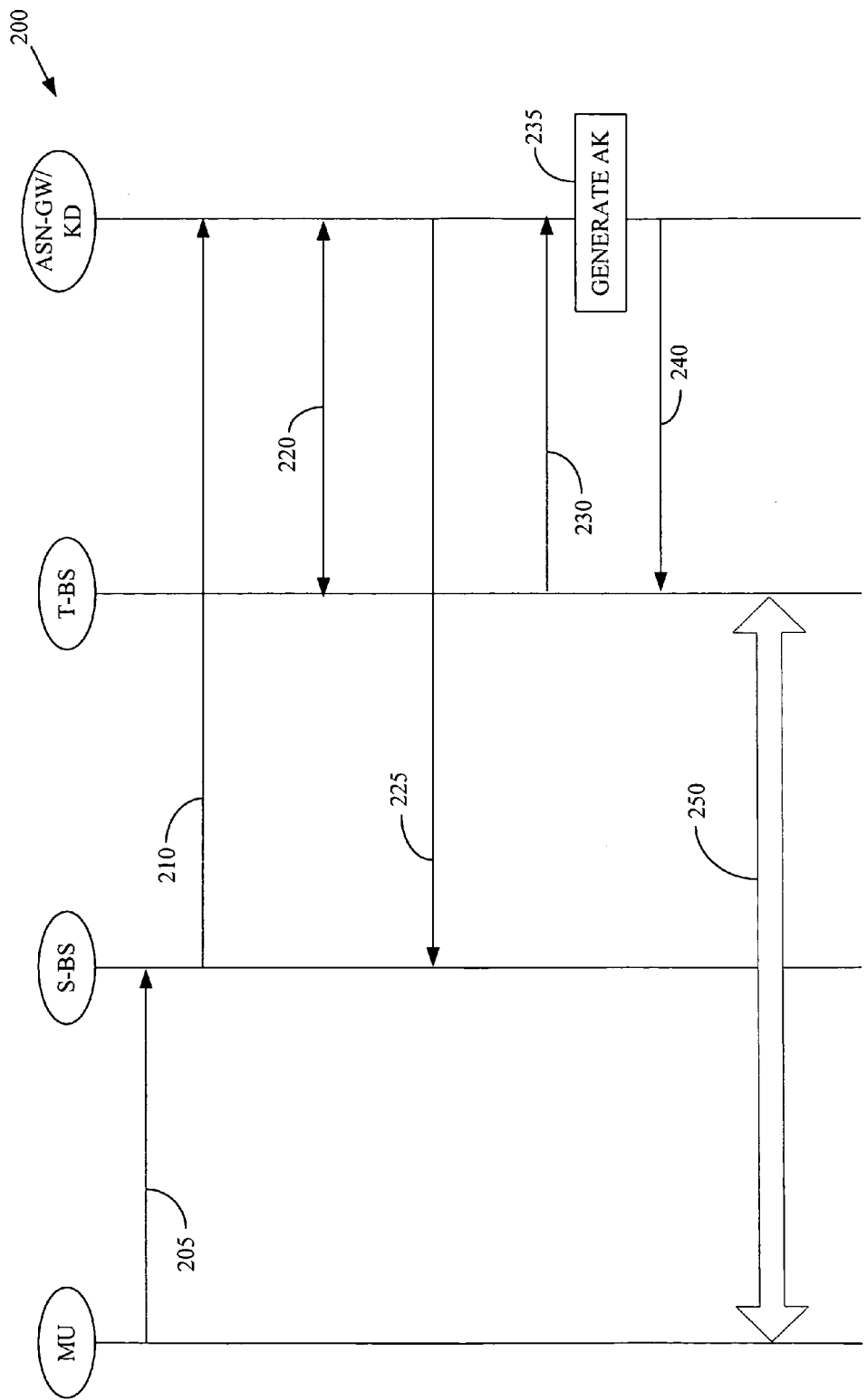
FIG. 2 conceptually illustrates a first exemplary embodiment of a method of cryptographic synchronization, in accordance with the present invention.

FIG. 2 conceptually illustrates a first exemplary embodiment of a method 200 of cryptographic synchronization. In the illustrated embodiment, a mobile unit (MU) initiates a hand off from a source base station (S-BS) to a target base station (T-BS) by providing an access message that indicates that the mobile unit intends to move from the source base station to the target base station, as indicated by the arrow 205. In one embodiment, the access message may be a Hand-off Indication (MOB_HO_IND) message defined by the IEEE 802.16 standards. The access message includes information indicative of the uplink crypto-sync counter and the value of the register including a last received and authenticated value of the downlink crypto-sync counter. For example, the access message may include information indicative of a CMAC_PN_U counter and a CMAC_REG_D register value.

The access message also includes a message authentication code, such as a CMAC and/or an HMAC, which may be computed using some or all of the contents of the access message and an authorization key associated with the source base station. However, counters and registers are not just restricted to the CMAC message authentication code. For example, an 802.16e-defined HMAC_PN_U counter is associated with a particular form of the HMAC called the Short-HMAC. According to the IEEE 802.16e, the authorization key may be precomputed by the mobile unit for the source base station using the established security association between the mobile unit and an Access Serving Network Gateway (ASN-GW, not shown). In one embodiment, the message authentication code may also be computed using the uplink crypto-sync counter.

The source base station may then provide a handoff request message to the key distributor (KD), as indicated by the arrow 210, which indicates that the mobile unit should be handed off from the source base station to the target base station. In the illustrated embodiment, the key distributor is co-located with the ASN-GW. In response to receiving the handoff request message, the ASN-GW/KD and the target base station exchange information that may be used to prepare for the handoff, as indicated by the arrow 220. The information exchange (at 220) may be referred to as the handoff preparation phase. The ASN-GW/KD may then provide a confirmation message to the source base station that indicates that the target base station is ready to accept a handoff of the mobile unit from the source base station, as indicated by the arrow 225.

The target base station may provide a request for an authorization key and a crypto-sync tuple, as indicated by the arrow 230. The key distributor may then generate (at 235) the authorization key (AK2) and may then provide the authorization key and the crypto-sync tuple to the target base station, as indicated by the arrow 240. In the illustrated embodiment, the crypto-sync tuple includes information indicative of the downlink crypto-sync counter and the value of the register indicating a last received and authenticated value of the uplink crypto-sync counter, e.g., the tuple {CMAC_PN_D, CMAC_REG_U}. The target base station may be ready to begin secure communications with the mobile unit after receiving the authorization key and the crypto-sync tuple (at 240).

The mobile unit and the target base station may begin communicating, as indicated by the arrow 250. The mobile unit and the target base station may then mutually authenticate by providing messages including message authentication codes formed using the uplink and downlink crypto-sync counters. In one embodiment, the target base station verifies that the value of the uplink crypto-sync counter CMAC_PN_U received from the mobile unit is larger than the last received and authenticated value of the uplink crypto-sync counter stored in the register CMAC_REG_U. In the illustrated embodiment, the last received and authenticated of the register CMAC_REG_U is received from the backhaul during the HO preparation phase.

The target base station may continue to increment the value of the downlink crypto-sync counter CMAC_PN_D prior to each message that is transmitted over the downlink to the mobile unit. The mobile units may then verify that the value of CMAC_PN_D is larger than the current value of the last received and authenticated value of the downlink crypto-sync counter stored in the register CMAC_REG_D. A repeat and/or replay attack may be suspected if either of these verifications/validations fails. In one embodiment, additional crypto-sync verification can be attempted, as described below, or a new EAP re-keying sequence (as defined by IEEE 802.16) may be initiated if a repeat and/or replay attack is suspected.

Figure 3:
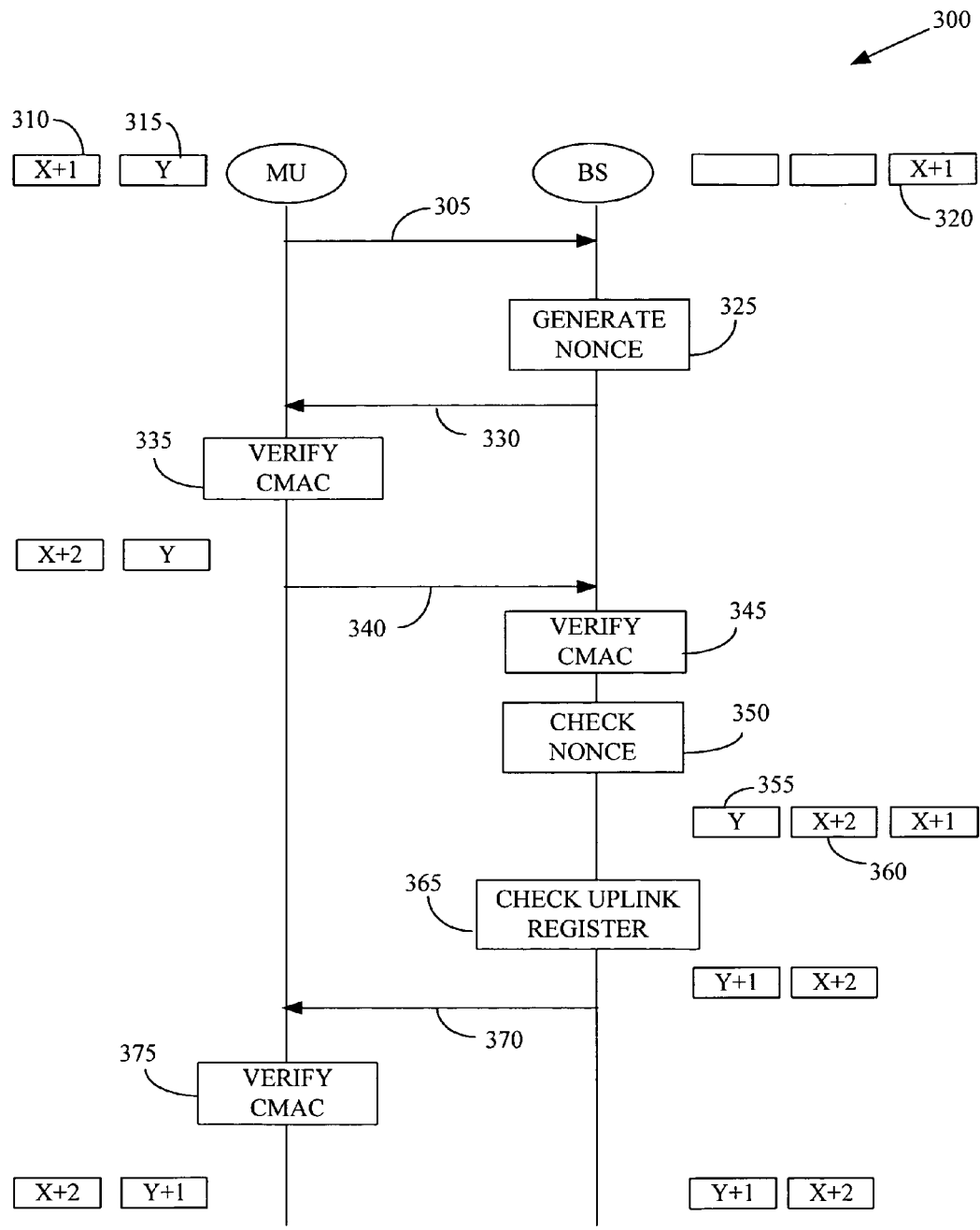
FIG. 3 conceptually illustrates a second exemplary embodiment of a method of cryptographic synchronization, in accordance with the present invention.

FIG. 3 conceptually illustrates a second exemplary embodiment of a method 300 of cryptographic synchronization. In the illustrated embodiment, a mobile unit (MU) wakes up from an inactive or idle mode and provides a message indicating that the mobile unit intends to initiate communication with a base station (BS), as indicated by the arrow 305. In one embodiment, the message provided (at 305) includes information indicative of the incremented value (X+1) of the uplink crypto-sync counter 310. For example, the mobile unit may transmit (at 305) a RNG_REQ message including the CMAC and CMAC_PN_U to the base station. This CMAC is optional per 802.16e, but including it can enhance security. In another embodiment that may further enhance the authentication of a later message, the included information may be indicative of the maximum value of the incremented value (X+1) of the uplink crypto-sync counter 310 and the incremented value (Y+1) of the last received and authenticated value of the downlink crypto-sync counter stored in the register CMAC_REG_D. The mobile unit may increment the CMAC_PN_U counter immediately prior to transmitting the RNG-REQ message to the base station.

The base station may not be able to assume that the correct values of the uplink and/or downlink crypto-sync counters have been provided. For example, the base station may not be able to authenticate the RNG-REQ message because the base station may not possess the full AK context. The base station may therefore store the value of the provided uplink crypto-sync counter in a temporary register 320. The base station generates (at 325) a nonce, e.g., an unpredictable number such as a 64-bit random number or a global counter whose associated CMAC value cannot be predicted. In one embodiment, a message may be formed using the nonce and the value of the uplink crypto-sync counter stored in the temporary register 320.

An escape code may also be used when forming the message. The escape code is a sequence of bits that may be used to differentiate this message from other messages of the same type that are needed for different applications. This escape code could be one of a large class of escape codes that can be used to redefine the meaning of standard 802.16e messages by replacing their uplink or downlink counter parameters with the code(s) and replacing some of the other parameter space with the displaced counter parameter value(s). For example, instead of having a single escape sequence for the RNG-RSP message, a class of sequences may be defined for use by any CMAC'ed message. Portions of the PN_U and PN_D address space above and including 0xFF 00 00 00 may be reserved for escape sequences, which may shrink the crypto-sync space by less than 1% but may also allow an escape sequence space of size 2**24. For example, the 24-bit field may be partitioned into 8 bits for escape type and 16 bits for escape data.

To implement newly defined-downlink messages, this escape sequence may be placed in the PN_D parameter of the SA-TEK Challenge message and the actual crypto-sync may be placed in the lower 32 bits of the Challenge message's 64-bit BS_Random parameter. The remaining 32 bits of this parameter can be used for more data. To implement newly defined-uplink messages, the escape sequence may be placed in the PN_U parameter of the SA-TEK Request message and the actual crypto-sync may be placed in the lower 32 bits of the Request message's 64-bit BS_Random parameter. The remaining 32 bits of this parameter and the 64 bits of the MS_Random parameter can be used for more data. Other messages could also be used for this purpose.

The base station may therefore form an SA-TEK-Challenge message using the nonce for its BS_Random parameter, and the value of the uplink crypto-sync counter stored in the temporary register 320 and/or an escape code for its downlink crypto-sync parameter. The SA-TEK-Challenge message may identify an AK challenge to be used for the security associations and may accept the aforementioned nonce as one of its parameters called BS_Random that may be subsequently included by the mobile unit in a SA-TEK-Request message. For another example, the base station may form an RNG-RSP message using the nonce in the value of the uplink crypto-sync counter stored in the temporary register 320. The message may then be provided to the mobile unit, as indicated by the arrow 330.

The mobile unit may verify (at 335) the received message (e.g., a message including a CMAC) by not checking the provided counter value and may then transmit a message formed using an incremented value of the uplink crypto-sync counter, the last received and authenticated value of the downlink crypto-sync counter, and the provided nonce, as indicated by the arrow 340. The value of the uplink crypto-sync counter may be incremented by a predetermined, selected, and/or expected offset value. For example, the value of the uplink crypto-sync counter may be incremented by one for each message transmitted. In one embodiment, the transmitted message may be an appropriately crafted SA-TEK-Request message, which may contain the {CMAC_PN_U, CMAC_REG_D} tuple as the MS_Random parameter and the aforementioned nonce as the BS_Random parameter where the CMAC_PN_U value has been appropriately incremented.

The base station may then verify (at 345) the received message (e.g., a message including a CMAC) by not checking the provided counter value. The base station may also check (at 350) that the correct value of the nonce was included in the message. Proper validation (at 345) of the attached CMAC proves legitimacy of the mobile unit, its possession of the AK, and validity of suggested tuple. The downlink crypto-sync counter 355 may be set or initialized to the value (Y) and the value (X+2) of the uplink crypto-sync counter provided (at 340) by the mobile unit may be stored in the register 360. In various alternative embodiments, the value (X+2) of the incremented expected value of the uplink crypto-sync counter may be retrieved from the current value of the uplink crypto-sync counter included in the CMAC or from the MS_Random parameter. In one embodiment, the base station may now have a full authenticated AK context.

The base station may then verify (at 365) that the value of the uplink crypto-sync provided (at 340) differs from the value of the uplink crypto-sync initially provided (at 305) by the mobile unit by a fixed offset. In one embodiment, the base station may verify (at 365) that the value of the uplink crypto-sync provided (at 340) is one larger than the value of the uplink crypto-sync initially provided (at 305) by the mobile unit, i.e., the value of the uplink crypto-sync (X+2) is one larger than the value of the initial uplink crypto-sync (X+1). For example, the base station may verify (at 365) that the CMAC count associated with the RNG-REQ message provided (at 305) was correct by confirming that the value of the CMAC count associated with the RNG-REQ message is one less than the count associated with the SA-TEK-Request message. In one embodiment, the base station then computes the CMAC for the RNG-REQ message, verifies it, and can then perform the system operations associated with this message. Another embodiment may have verified the RNG-REQ CMAC at the time that it was received by not checking the provided counter value. The counter value itself may then be checked later (at 365) to complete the authentication.

The base station may provide a message indicating successful reception of the context information, as indicated by the arrow 370. In one embodiment, the base station provides a message that securely informs the mobile unit that the base station has successfully received the full AK context. For example, the provided message may be a SA-TEK Response, a CMAC'ed RNG-RSP, or any other CMAC'ed message. Verification (at 375) of this message at the mobile unit proves that the base station received the SA-TEK-Request message containing the proper value of CMAC_REG_D, e.g., the value included in the SA-TEK-Request message that was provided (at 340) by the mobile unit. Successful reception and validation of this message constitutes successful completion of the tuple validation method 300.

Although the second exemplary embodiment of the method 300 assumes that the tuple is maintained on the mobile unit, the present invention is not so limited. In alternative embodiments, the tuple may be maintained on the base station or any other location. For example, a non-WiMAX system may have different needs such that it is more desirable to store the counter and/or register values in the network rather than the mobile unit. If so, the above procedure, appropriately modified to reverse the roles of mobile unit and base station, may still be used to mutually authenticate the mobile units in the base station.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:

establishing, at a mobile unit, an uplink counter for a security association between the mobile unit and a first base first base station that has established a downlink counter for the security association, wherein the uplink counter is incremented prior to each message transmitted to the first base station and the downlink counter is incremented prior to each message transmitted to the mobile unit;

receiving, at the mobile unit, a message authentication code from the second base station, the message authentication code being formed using values of the uplink counter and the downlink counter provided to the second base station by a key distributor; and mutually authenticating the mobile unit and a second base station by comparing values of the uplink counter and the downlink counter stored in the mobile unit to values of the uplink counter and the downlink counter provided to the second base station in response to the mobile unit handing off from the first base station to the second base station and determining, at the mobile unit, that the value of the downlink counter received from the second base station is larger than the value of the downlink counter stored by the mobile unit.

2. The method of claim 1, wherein mutually authenticating the mobile unit and the second base station comprises changing message authentication codes formed using a secret key and at least one of the values of the uplink counter and the downlink counter stored in the mobile unit and the second base station.

3. The method of claim 1, wherein mutually authenticating the mobile unit and the second base station comprises determining, at the mobile unit, that the value of the downlink counter received from the second base station is larger than a value of a downlink counter received from the first base station and stored by the mobile unit.

4. A method, comprising:

establishing, at a first base station, a downlink counter for a security association between the first base station and a mobile unit that has established an uplink counter for the security association, the downlink counter being incremented prior to each message transmitted to the mobile unit and the uplink counter being incremented prior to each message transmitted to the first base station;

transmitting to the mobile unit a message authentication code, the message authentication code being formed using values of the uplink counter and the downlink counter provided to the second base station by a key distributor;

mutually authenticating the mobile unit and a second base station by comparing values of the uplink counter and the downlink counter stored in the mobile unit to values of the uplink counter and the downlink counter provided to the second base station in response to the mobile unit handing off from the first base station to the second base station and determining, at the second base station, that the value of the downlink counter received from the mobile unit is larger than the value of the downlink counter stored by the second base station; and providing a first message to the mobile unit in response to authenticating the mobile unit.

5. The method of claim 4, wherein mutually authenticating the mobile unit and the second base station comprises exchanging message authentication codes formed using a secret key and at least one of the values of the uplink counter and the downlink counter stored in the mobile unit and the second base station.

6. The method of claim 4, wherein mutually authenticating the mobile unit and the second base station comprises:
receiving, at the second base station and from a key distributor, values of the uplink counter and the downlink counter;
receiving, at the second base station, a message authentication code from the mobile unit, the message authentication code being formed using values of the uplink counter and the downlink counter stored at the mobile unit; and
comparing, at the second base station, the values of the uplink counter and the downlink counter stored by the second base station and received from the mobile unit.

7. The method of claim 6, wherein mutually authenticating the mobile unit and the second base station comprises determining, at the second base station, that the value of the downlink counter received from the mobile unit is larger than the value of the downlink counter stored by the second base station.

8. The method of claim 7, wherein mutually authenticating the mobile unit and the second base station comprises determining, at the second base station, that the value of the downlink counter received from the mobile unit is larger than a value of a downlink counter received from the first base station and stored by the mobile unit.

9. A method, comprising:
transmitting, from a mobile unit, a value of an uplink counter in response to the mobile unit waking up from an inactive mode, and wherein the mobile unit has also stored a previously authenticated value of a downlink counter;
receiving, at the mobile unit and from a base station, a first message formed using a nonce and the value of the uplink counter, the first message being formed using a value of the uplink counter provided to the base station by a key distributor;
transmitting, from the mobile unit in response to receiving the first message, a second message formed using the nonce, an incremented value of the uplink counter, and the value of the downlink counter; and
receiving, at the mobile unit and from the base station, a third message indicating validation of the incremented value of the uplink counter and the value of the downlink counter when the value of the downlink counter is larger than the value of the downlink counter stored by the base station.

10. The method of claim 9, wherein receiving the first message comprises receiving a first message including an escape code indicating that the message includes the nonce and the value of the uplink counter provided by the base station.

11. The method of claim 10, comprising validating the first message without checking the value of the uplink counter in the first message.

12. The method of claim 11, wherein transmitting the second message comprises transmitting a second message formed using the nonce, the incremented value of the uplink counter, and the previously authenticated value of the downlink counter.

13. A method, comprising:
receiving, at a base station and from a mobile unit, a value of an uplink counter in response to the mobile unit waking up from an inactive mode, and wherein the mobile unit has also stored a previously authenticated value of a downlink counter;
transmitting, from the base station to the mobile unit, a first message formed using a nonce and the value of the uplink counter provided to the base station by a key distributor;
receiving, at the base station and from the mobile unit in response to transmitting the first message, a second message formed using the nonce, an incremented value of the uplink counter, and the value of the downlink counter; and
validating, at the base station, the incremented value of the uplink counter and the value of the downlink counter when the value of the downlink counter is larger than the value of the downlink counter stored by the base station.

14. The method of claim 13, wherein transmitting the first message comprises transmitting a first message including an escape code indicating that the message includes the nonce and the value of the uplink counter provided by the base station.

15. The method of claim 14, wherein receiving the second message comprises receiving a second message formed using the nonce, the incremented value of the uplink counter, and the previously authenticated value of the downlink counter.

16. The method of claim 15, wherein validating the incremented value of the uplink counter and the value of the downlink counter comprises receiving a third message from the mobile unit including information indicating the incremented value of the uplink counter and the value of the downlink counter.

17. The method of claim 16, comprising transmitting, from the base station and to the mobile unit, a third message indicating validation of the incremented value of the uplink counter and the value of the downlink counter.

* * * * *